US008009899B2

(12) United States Patent
Chen et al.

(10) Patent No.: US 8,009,899 B2
(45) Date of Patent: Aug. 30, 2011

(54) IMAGE FILLING METHODS

(75) Inventors: Chia-Chen Chen, Hsinchu (TW);
Cheng-Yuan Tang, Taipei County (TW);
Yi-Leh Wu, Taipei (TW); Chi-Tsung Liu, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 1080 days.

(21) Appl. No.: 11/812,942

(22) Filed: Jun. 22, 2007

(65) Prior Publication Data
US 2008/0199083 A1 Aug. 21, 2008

(30) Foreign Application Priority Data
Feb. 15, 2007 (TW) .............................. 96105667 A (51) Int. Cl.
*G06K 9/00* (2006.01)
(52) U.S. Cl. ........ 382/154; 345/419; 345/632; 382/103; 382/254
(58) Field of Classification Search .................. 345/419, 345/422, 629, 633; 382/103, 107, 154, 254
See application file for complete search history.

(56) References Cited

U.S. PATENT DOCUMENTS

| 6,266,068 B1 * | 7/2001 | Kang et al. ..................... 345/629 |
| 6,381,302 B1 * | 4/2002 | Berestov ........................... 378/41 |
| 6,393,144 B2 * | 5/2002 | Rogina et al. .................. 382/154 |
| 6,987,520 B2 | 1/2006 | Criminisi et al. |
| 6,990,228 B1 * | 1/2006 | Wiles et al. .................... 382/154 |
| 7,031,497 B2 * | 4/2006 | Trajkovi ....................... 382/107 |
| 2003/0146922 A1 * | 8/2003 | Navab et al. .................. 345/633 |
| 2005/0140670 A1 * | 6/2005 | Wu et al. ........................ 345/419 |
| 2005/0169543 A1 * | 8/2005 | Damera-Venkata .......... 382/236 |
| 2006/0034485 A1 * | 2/2006 | Negahdaripour ............. 382/103 |
| 2006/0045372 A1 * | 3/2006 | Wang et al. .................... 382/254 |
| 2006/0066612 A1 * | 3/2006 | Yang et al. .................... 345/419 |
| 2006/0120712 A1 * | 6/2006 | Kim .............................. 396/333 |
| 2007/0057946 A1 * | 3/2007 | Albeck et al. ................. 345/427 |

OTHER PUBLICATIONS

Alexandru Telea, "An Image Inpainting Technique Based on the Fast Marching Method," Eindhoven University of Technology, 2004, vol. 9, No. 1: pp. 25-36.
Manuel M. Oliveira et al., "Fast Digital Image Inpainting," Department of Computer Science, State University of New York at Stony Brook, 2001, pp. 1-7.
Thesis Title: "Image Inpainting from a Sequence of Images".
Research on Robust Estimation for Computer Vision.

* cited by examiner

*Primary Examiner* — Gregory M Desire
(74) *Attorney, Agent, or Firm* — Birch, Stewart, Kolasch & Birch, LLP (57) ABSTRACT

Image filling methods. A plurality of images corresponding to a target object or a scene are captured at various angles. An epipolar geometry relationship between a filling source image and a specific image within the images is calculated. The filling source image and the specific image are rectified according to the epipolar geometry relationship. At least one filling target area in the rectified specific image is patched according to the rectified filling source image.

24 Claims, 13 Drawing Sheets
(6 of 13 Drawing Sheet(s) Filed in Color)

IMAGE FILLING METHODS

BACKGROUND OF THE INVENTION

1. Field of the Invention

The disclosure relates generally to image filling methods, and, more particularly to image filling methods using epipolar geometry relationships between images in different capturing angles.

2. Description of the Related Art

Target objects or scenes, such as buildings, historic monuments, large-scale landscapes and devices, may be obstructed by unwanted objects during image capture thereof, resulting in incomplete images. Some obstructions may be automatically removed, such as vehicles or pedestrians, while others, such as signboards, signs, trees or other buildings, cannot. In this case, no complete image of a target object can be obtained even if images of the target object are captured from various angles. The unwanted obstructions can create considerable interference in digital image preservation and 3D model construction for historic monuments and buildings.

Manuel M. Oliverira proposed an inpainting algorithm in 2001. Alexandru Telea proposed a fast marching method (FMM) in 2004. These proposed methods are used for quickly patching loss or destruction of small area targets within an image. In these methods, the time for image inpainting with small area targets can be reduced. However, blur may be generated for images including large area targets.

U.S. Pat. No. 6,987,520 discloses an exemplar-based method integrating image inpainting and texture synthesis. In this method, an image is inpainted according to direction and intensity of image edges, and reliability of pixels. During image inpainting, the inpainting is progressive from known image areas adjacent to a target area. The accuracy of image inpainting is higher if the variation of image texture is regular. Since the image inpainting is still based on other areas of image, the result may be also undesirable.

BRIEF SUMMARY OF THE INVENTION

Image filling methods are provided.

An image filling method, a plurality of images corresponding to a target object or a scene is captured at various angles. An epipolar geometry relationship between a filling source image and a specific image within the images is calculated. The filling source image and the specific image are rectified according to the epipolar geometry relationship. At least one filling target area in the rectified specific image is patched according to the rectified filling source image.

Image filling methods may take the form of program code embodied in a tangible media. When the program code is loaded into and executed by a machine, the machine becomes an apparatus for practicing the disclosed method.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The invention will become more fully understood by referring to the following detailed description with reference to the accompanying drawings, wherein.

DETAILED DESCRIPTION OF THE INVENTION

Image filling methods are provided.

Figure 1:
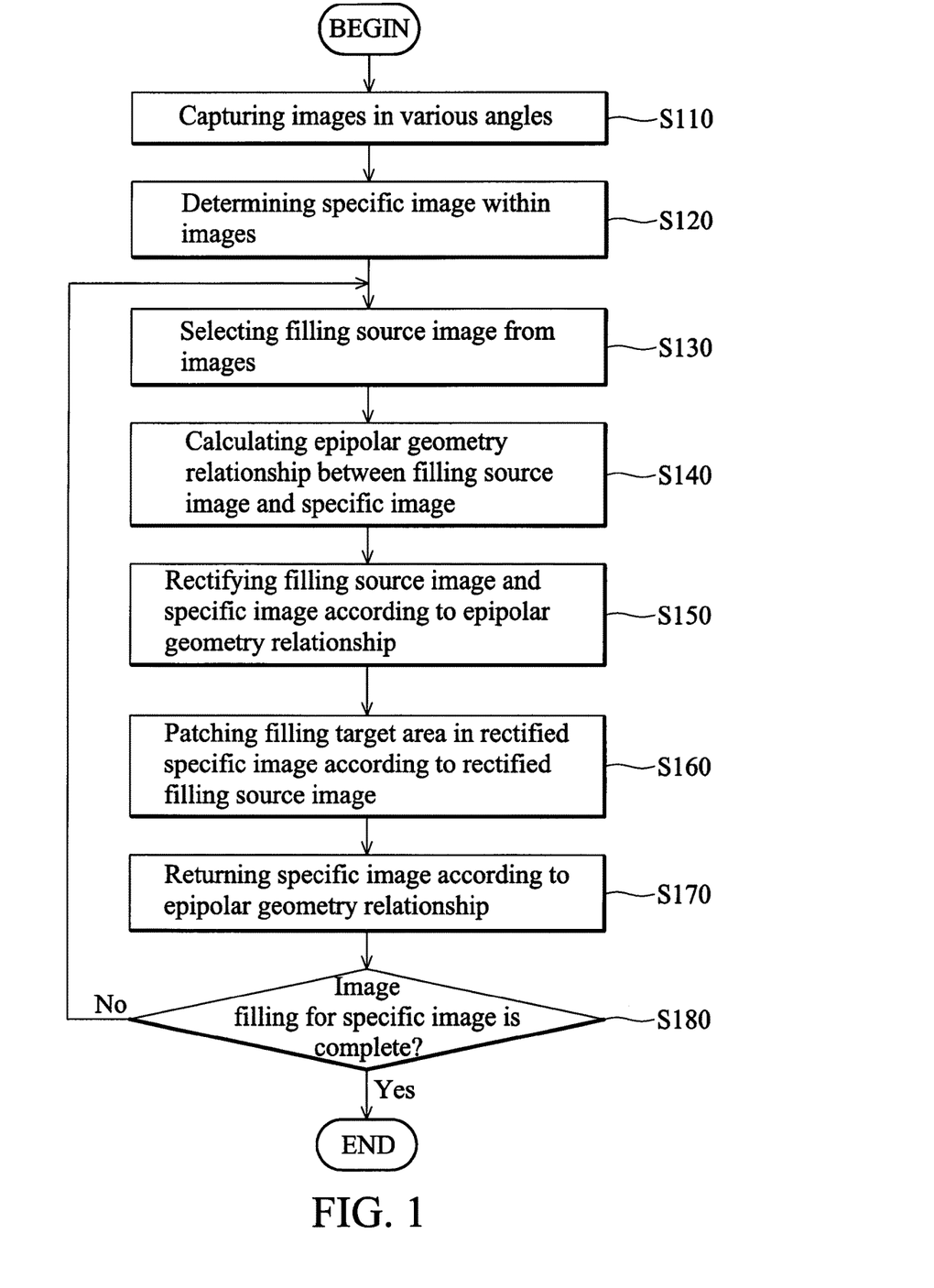
FIG. 1 is a flowchart of an embodiment of an image filling method.

FIG. 1 is a flowchart of an embodiment of an image filling method.

In step S110, a plurality of images corresponding to a target object or a scene in 3D space is captured at various angles using a video camera or a digital camera. In step S120, a specific image is determined from the images, and in step S130, a filling source image is selected from the rest of the images. The specific image is the image to be patched, and the filling source image can be used to patch filling targets in the specific image. In step S140, an epipolar geometry relationship between the filling source image and the specific image is calculated.

Figure 2:
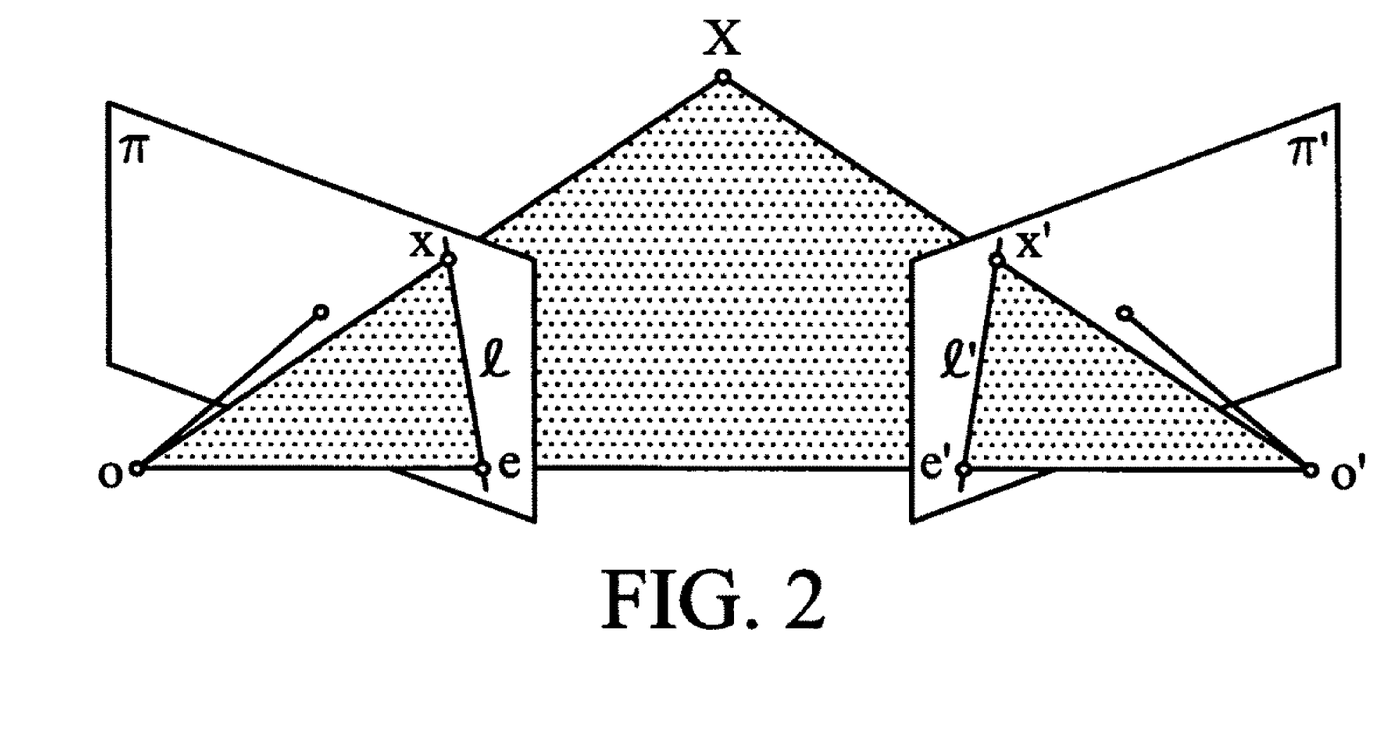
FIG. 2 illustrates an epipolar geometry relationship between images.

Epipolar geometry is the internal projection geometry relationship between two images. A fundamental matrix is used to represent the epipolar geometry relationship between two images. The epipolar geometry relationship is based on the intersections of a plane through a baseline and two image planes. It is assumed X is a point seen by two cameras simultaneously in 3D space, x is a 2D point corresponding to the projection of X on an image Π of the first camera, and x' is a 2D point corresponding to the projection of X on an image Π' of the second camera. FIG. 2 illustrates an epipolar geometry relationship between images. As shown in FIG. 2, 2D points x and x' in the images, 3D point X, and the centers of two cameras are coplanar. The projection lines from the centers of two cameras through x and x' to the 3D space intersect at point X in the 3D space, and the two projection lines fall in an epipolar plane formed by the X, O and O'. The epipolar geometry relationship can be used to find the corresponding relationship between points in two images.

Figure 3:
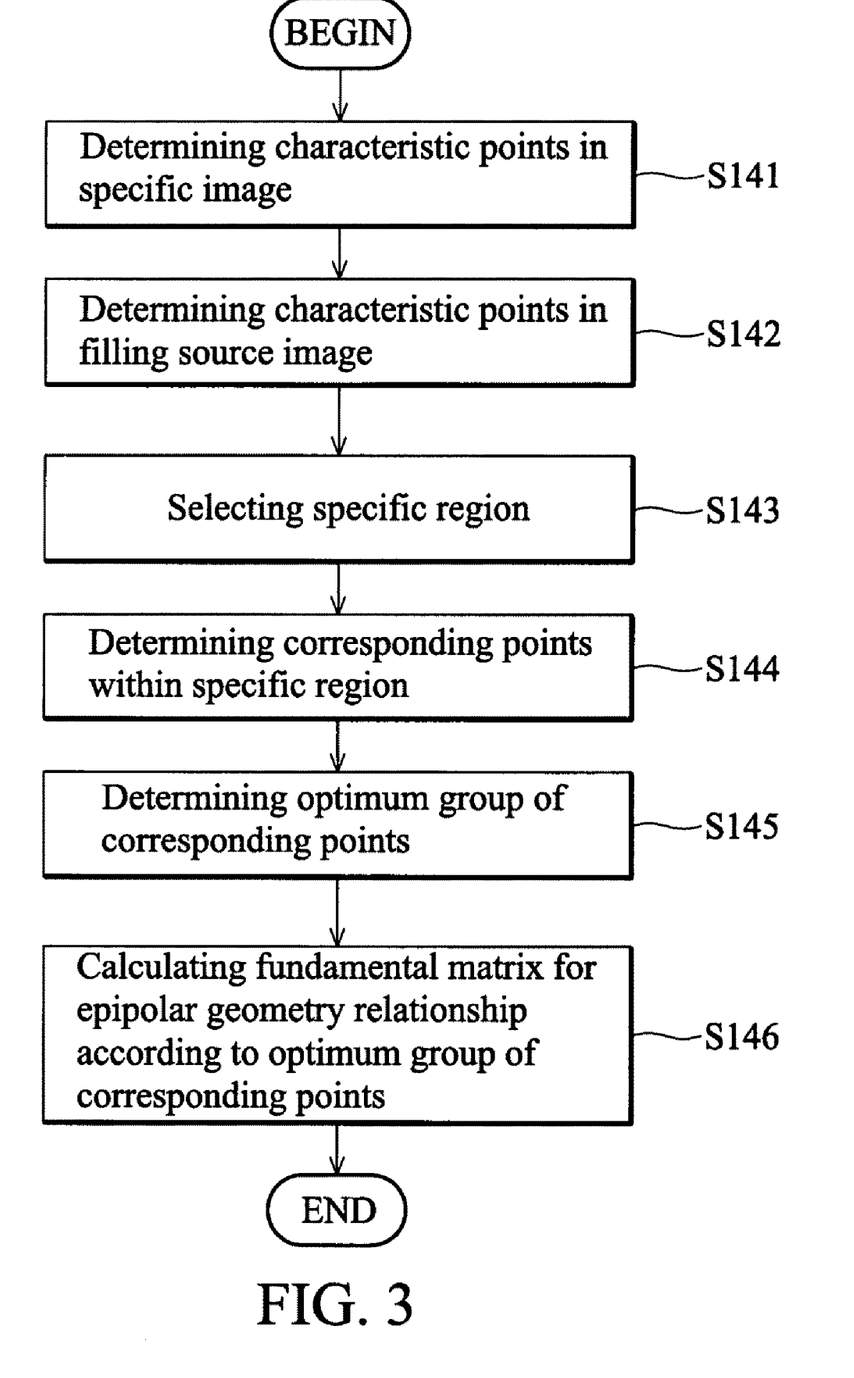
FIG. 3 is a flowchart of an embodiment of a method for calculating an epipolar geometry relationship.

FIG. 3 is a flowchart of an embodiment of a method for calculating an epipolar geometry relationship.

Figure 4A:
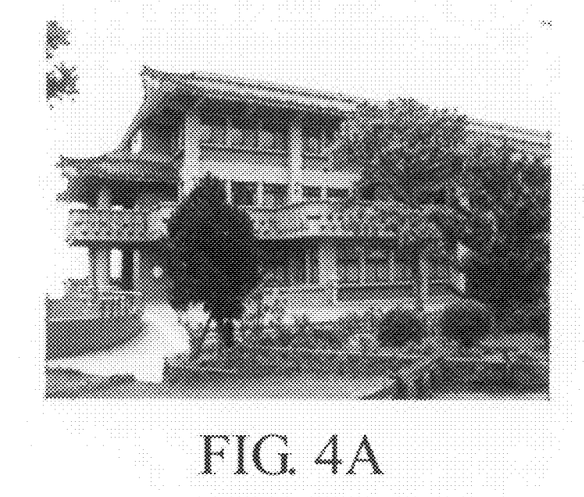
FIGS. 4A and 4B show characteristic points in a specific image and a filling source image, respectively.
Figure 4B:
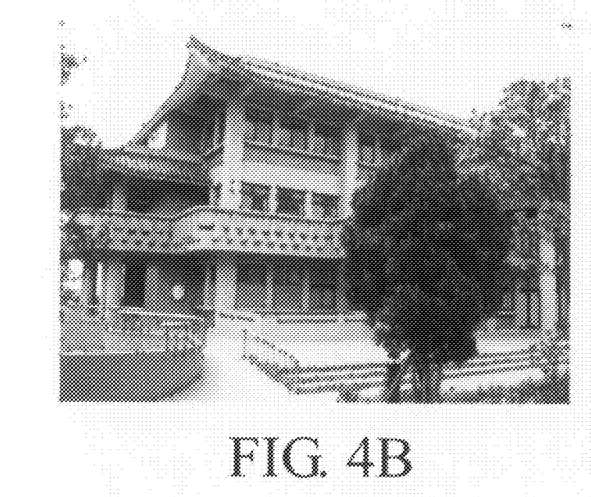
Figure 5A:
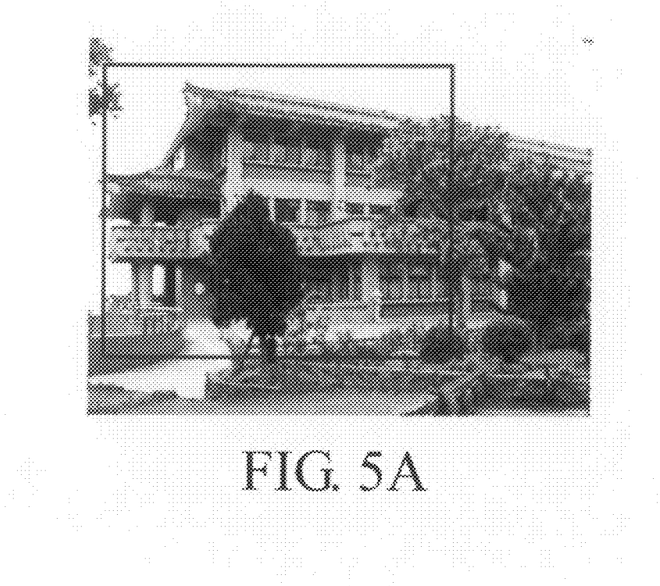
FIGS. 5A and 5B show the specific image and the filling source image after selecting a specific region, respectively.
Figure 5B:
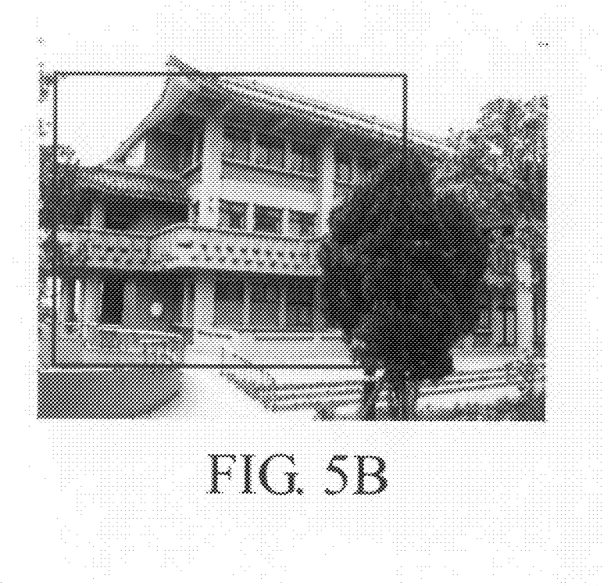
Figure 6A:
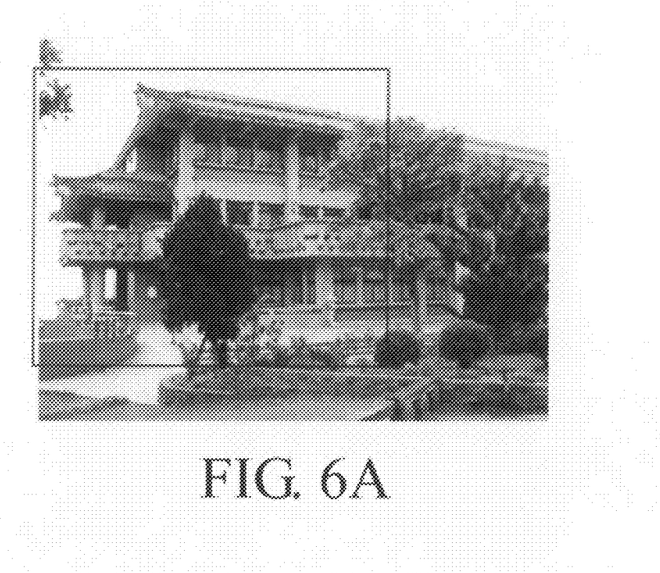
FIGS. 6A and 6B show corresponding points in the specific image and the filling source image, respectively.
Figure 6B:
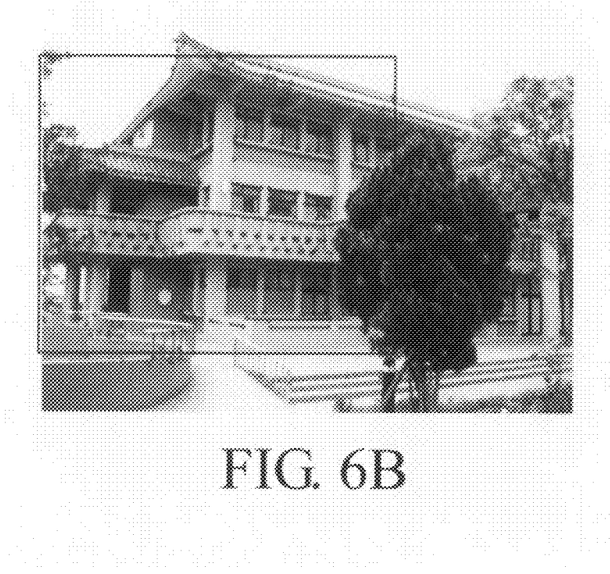
Figure 7A:
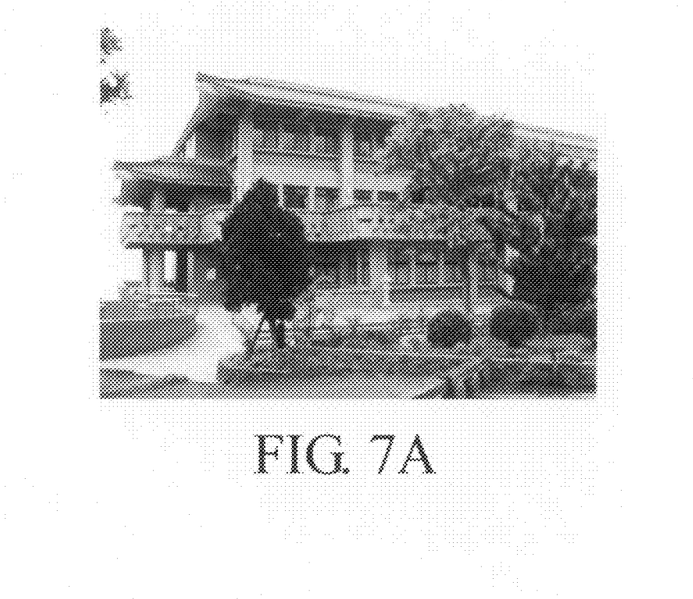
FIGS. 7A and 7B show an optimum group of corresponding points for the specific image and the filling source image, respectively.
Figure 7B:
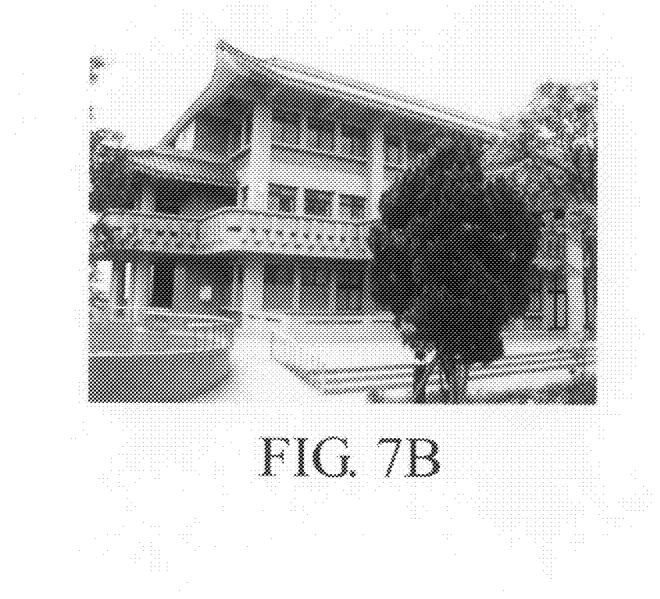

In steps S141 and S142, a method of seeking characteristic points, such as Harris corner detector is used to seek characteristic points in the specific image and the filling source image, as shown in FIGS. 4A and 4B, respectively. In step S143, a specific region is determined and selected in the specific image and the filling source image, as shown in FIGS. 5A and 5B, respectively. It is noted that corresponding points of images are sought from the characteristic points in the specific region. In step S144, a method seeking corresponding points, such as SSD (Sum of Squared Difference) is used to seek corresponding points from the characteristic points within the specific region, as shown in FIGS. 6A and 6B, respectively. In step S145, an optimum group of corresponding points for the specific image and the filling source image is determined from the corresponding points within the specific region according to LMedS (Least Median of Squares) or RANSAC (Random Sample Consensus), as shown in FIGS. 7A and 7B, respectively. In step S146, a fundamental matrix representing the epipolar geometry relationship between the specific image and the filling source image is calculated according to the corresponding points in the optimum group.

In the calculation for fundamental matrix, for two images in different capture angles, x is the coordinate of a point in the first image, and $I'_x$ is the corresponding epipolar line in the second image. Based on the fundamental matrix, a linear relationship $I_x'=Fx$ is provided, where F is the fundamental matrix. Since point x' corresponding to x in the second image is on line $I'_x$, the inner product of the x coordinate and the direction vector of $I'_x$ is zero, that is $x'^T I_x = x'^T F x = 0$, and $x'^T F^T x = 0$ after transformation. Thus the corresponding epipolar line $I_{x'}$ of x can be represented in Fx.

8 point estimation and 7 point estimation can be used to calculate the fundamental matrix.

8 point estimation, proposed by Longuet-Higgins (1981), introduces coefficients for matrix estimation. The theory can be used to estimate the fundamental matrix. In equation (4.1), 9 coefficients of fundamental matrix F are a linear system.

$$(u, v, 1)\begin{pmatrix} F_{11} & F_{12} & F_{13} \\ F_{21} & F_{22} & F_{23} \\ F_{31} & F_{32} & F_{33} \end{pmatrix}\begin{pmatrix} u' \\ v' \\ 1 \end{pmatrix} = 0 \quad (4.1)$$

Respective coefficients of fundamental matrix F can be calculated using equations of respective groups of corresponding points (p, p') conforming to epipolar geometry limitations. Since the coefficients of F are homogeneous, $F_{33}$ is set to 1, and equation (4.1) can be rewritten into a 8×8 linear equation set using 8 groups of corresponding points $(p_i, p'_i)$, i=1, ..., 8:

$$\begin{bmatrix} u_1 u'_1 & u_1 v'_1 & u_1 & v_1 u'_1 & v_1 v'_1 & v_1 & u'_1 & v'_1 \\ u_2 u'_2 & u_2 v'_2 & u_2 & v_2 u'_2 & v_2 v'_2 & v_2 & u'_2 & v'_2 \\ u_3 u'_3 & u_3 v'_3 & u_3 & v_3 u'_3 & v_3 v'_3 & v_3 & u'_3 & v'_3 \\ u_4 u'_4 & u_4 v'_4 & u_4 & v_4 u'_4 & v_4 v'_4 & v_4 & u'_4 & v'_4 \\ u_5 u'_5 & u_5 v'_5 & u_5 & v_5 u'_5 & v_5 v'_5 & v_5 & u'_5 & v'_5 \\ u_6 u'_6 & u_6 v'_6 & u_6 & v_6 u'_6 & v_6 v'_6 & v_6 & u'_6 & v'_6 \\ u_7 u'_7 & u_7 v'_7 & u_7 & v_7 u'_7 & v_7 v'_7 & v_7 & u'_7 & v'_7 \\ u_8 u'_8 & u_8 v'_8 & u_8 & v_8 u'_8 & v_8 v'_8 & v_8 & u'_8 & v'_8 \end{bmatrix} \begin{bmatrix} F_{11} \\ F_{12} \\ F_{13} \\ F_{21} \\ F_{22} \\ F_{23} \\ F_{31} \\ F_{32} \end{bmatrix} = - \begin{bmatrix} 1 \\ 1 \\ 1 \\ 1 \\ 1 \\ 1 \\ 1 \\ 1 \end{bmatrix} \quad (4.2)$$

A normalization method, such as a normalization proposed by Hartley can be used to normalize the 8 groups of corresponding points. The corresponding points can be centered on the original after translation and scaling, and the average distance to the original is $\sqrt{2}$. The calculation of fundamental matrix is first to appropriately translate and scale the image coordinates, and $\tilde{F}$ is calculated using 8 point estimation based on the normalized corresponding points. The rank of matrix is limited to 2, the singular values of F are factorized, and the last element of the diagonal matrix is set to 0. The fundamental matrix corresponding to the normalized corresponding points is returned to a final estimation of the fundamental matrix, $F = T'^{-T} \tilde{F} T^{-1}$ (4.3), $$\text{where, } T = \begin{bmatrix} s^{-1} & 0 & -s^{-1}\bar{u} \\ 0 & s^{-1} & -s^{-1}\bar{v} \\ 0 & 0 & 1 \end{bmatrix}, T' = \begin{bmatrix} s'^{-1} & 0 & -s'^{-1}\bar{u}' \\ 0 & s'^{-1} & -s'^{-1}\bar{v}' \\ 0 & 0 & 1 \end{bmatrix},$$

S is the standard deviation of elements, and $\bar{u} \cdot \bar{v}$ are means.

Since the rank of matrix is limited to 2, 7 independent parameters are present. If only 7 groups of corresponding points are known, the fundamental matrix F can be estimated using 7 point estimation. The same manner in 8 point estimation can be applied with a linear equation set Af=0. A is a 7×9 matrix, and the solution of the equation is $\alpha F_1 + (1-\alpha) F_2$ (4.4), where α is a scalar variable, $F_1$ and $F_2$ can be obtained from matrix A. Since the rank of matrix is 2, having the matrix properties of non-full rank, corresponding determinant equals 0, and $\det(F) = \det(\alpha F_1 + (1-\alpha) F_2) = 0$ (4.5) is obtained. A cubic polynomial is obtained to calculate α, where α may have one or three real number solutions, and F can be calculated by replacing α with the solutions in the equation.

Figure 8:
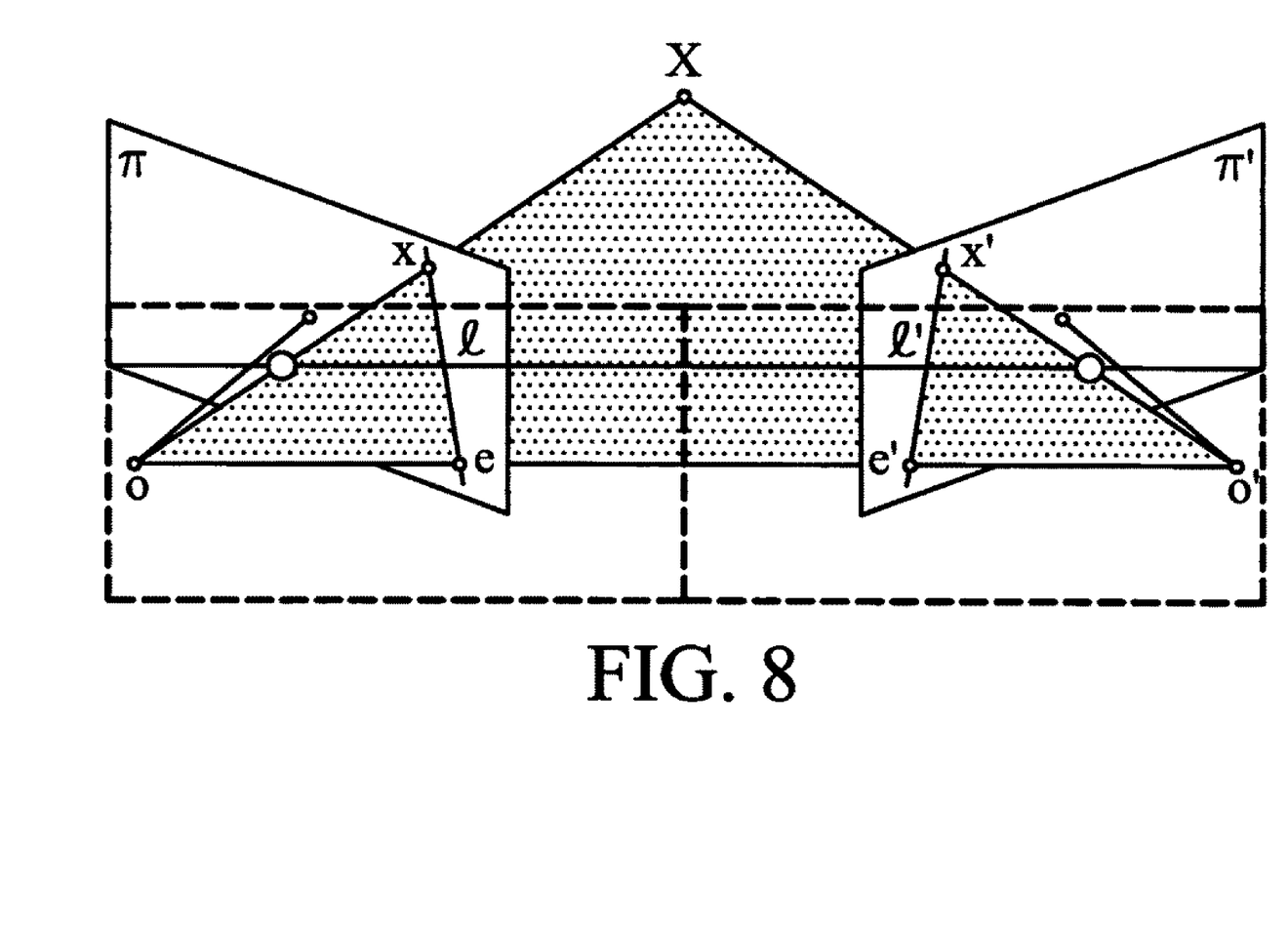
FIG. 8 is a schematic diagram illustrating epipolar rectification based on epipolar geometry relationship.
Figure 9A:
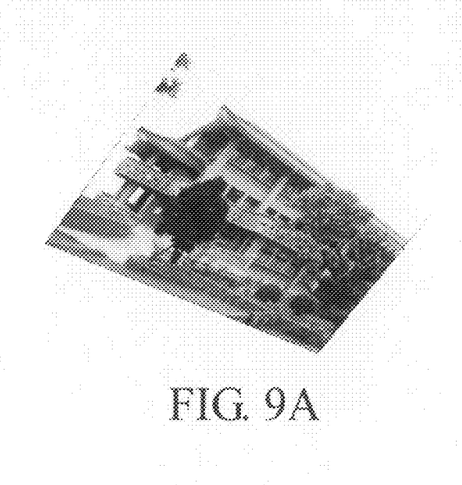
FIGS. 9A and 9B show the specific image and the filling source image after epipolar rectification, respectively.
Figure 9B:
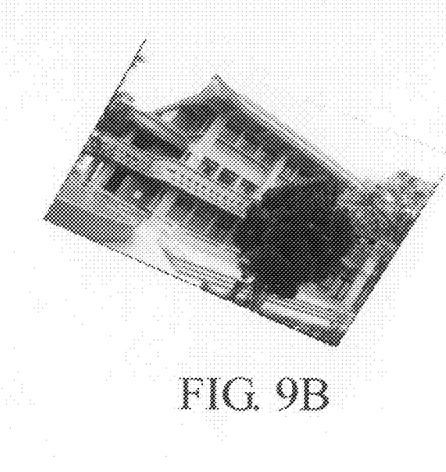

After the epipolar geometry relationship between the filling source image and the specific image is obtained, in step S150, the filling source image and the specific image are rectified according to the epipolar geometry relationship to transfer the epipolar lines to horizontal, as shown in FIG. 8. In FIG. 8, the dotted blocks are the rectified images, where corresponding points on two images are in a common axis. After epipolar line transfer, corresponding points of two images will be in the same horizontal with the same y coordinate, as shown in FIGS. 9A and 9B. In step S170, at least one filling target area in the rectified specific image is filled according to the rectified filling source image.

Figure 9C:
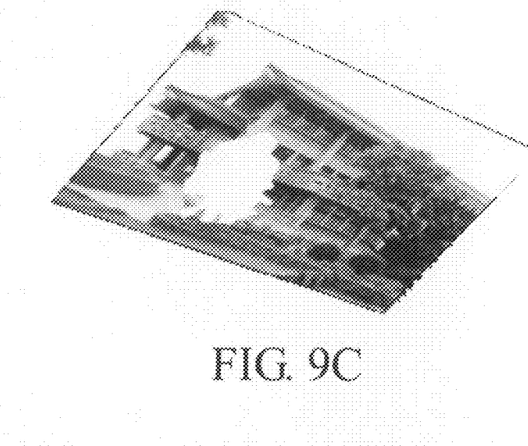
FIG. 9C shows the specific image with obstruction removal in FIG. 9A.
Figure 10:
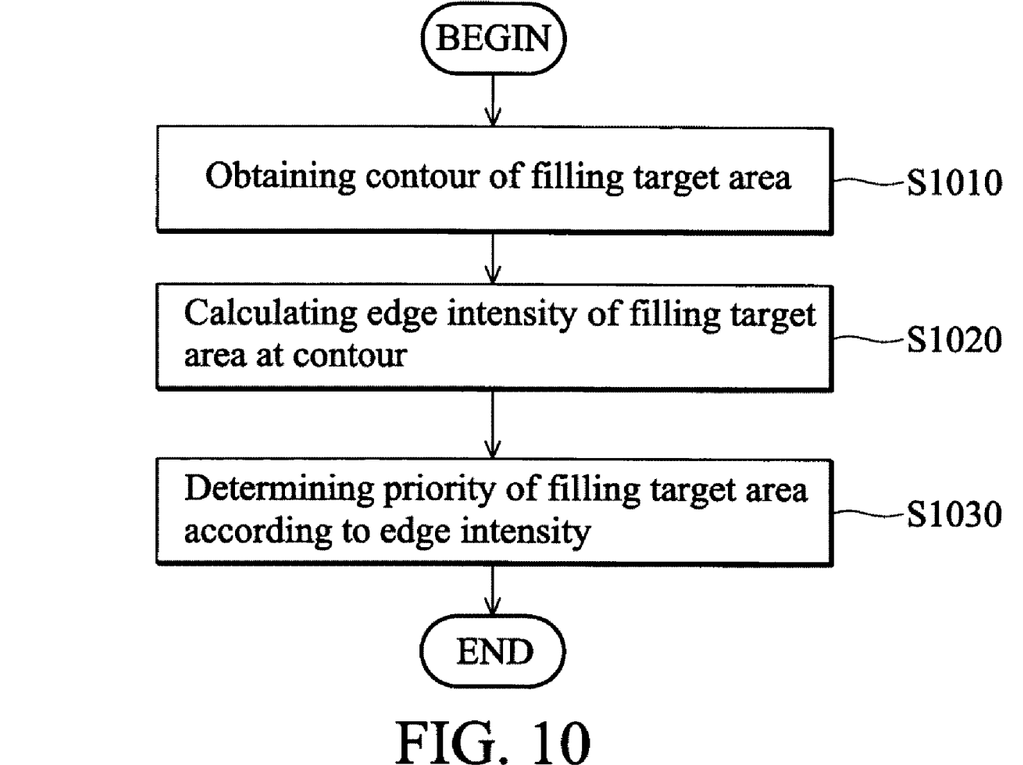
FIG. 10 is a flowchart of an embodiment of a method for determining the priority of filling target areas.
Figure 11:
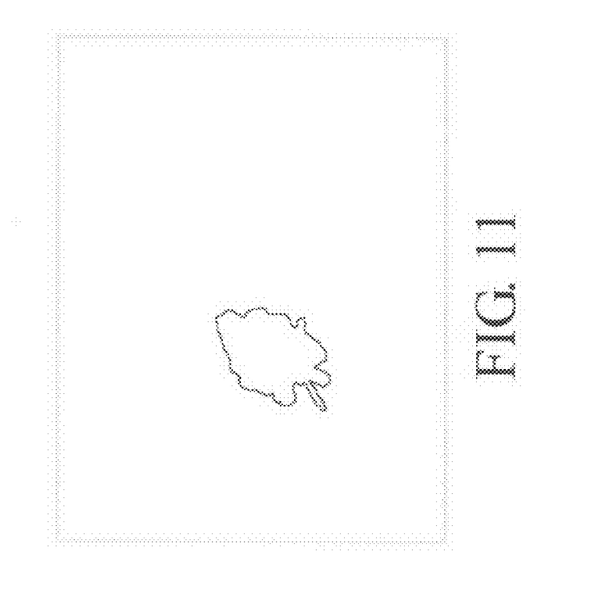
FIG. 11 shows the contour of obstruction in the specific image.
Figure 12:
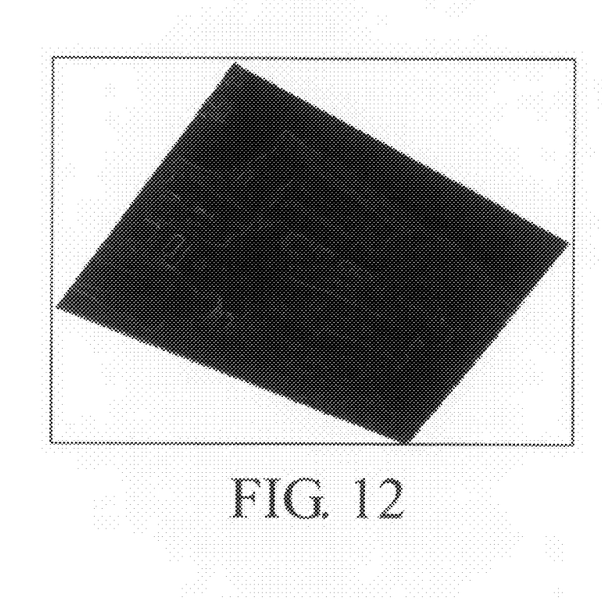
FIG. 12 shows the edges of the specific image.
Figure 13:
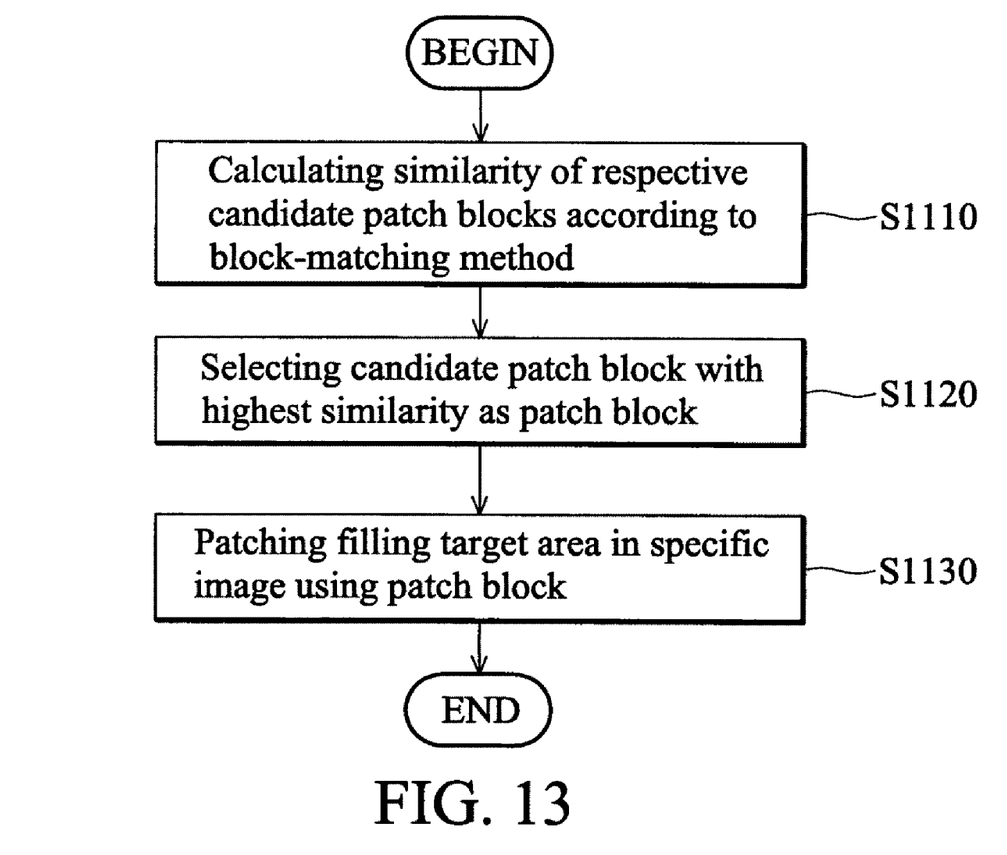
FIG. 13 is a flowchart of an embodiment of a method for patching filling target areas.
Figure 14:
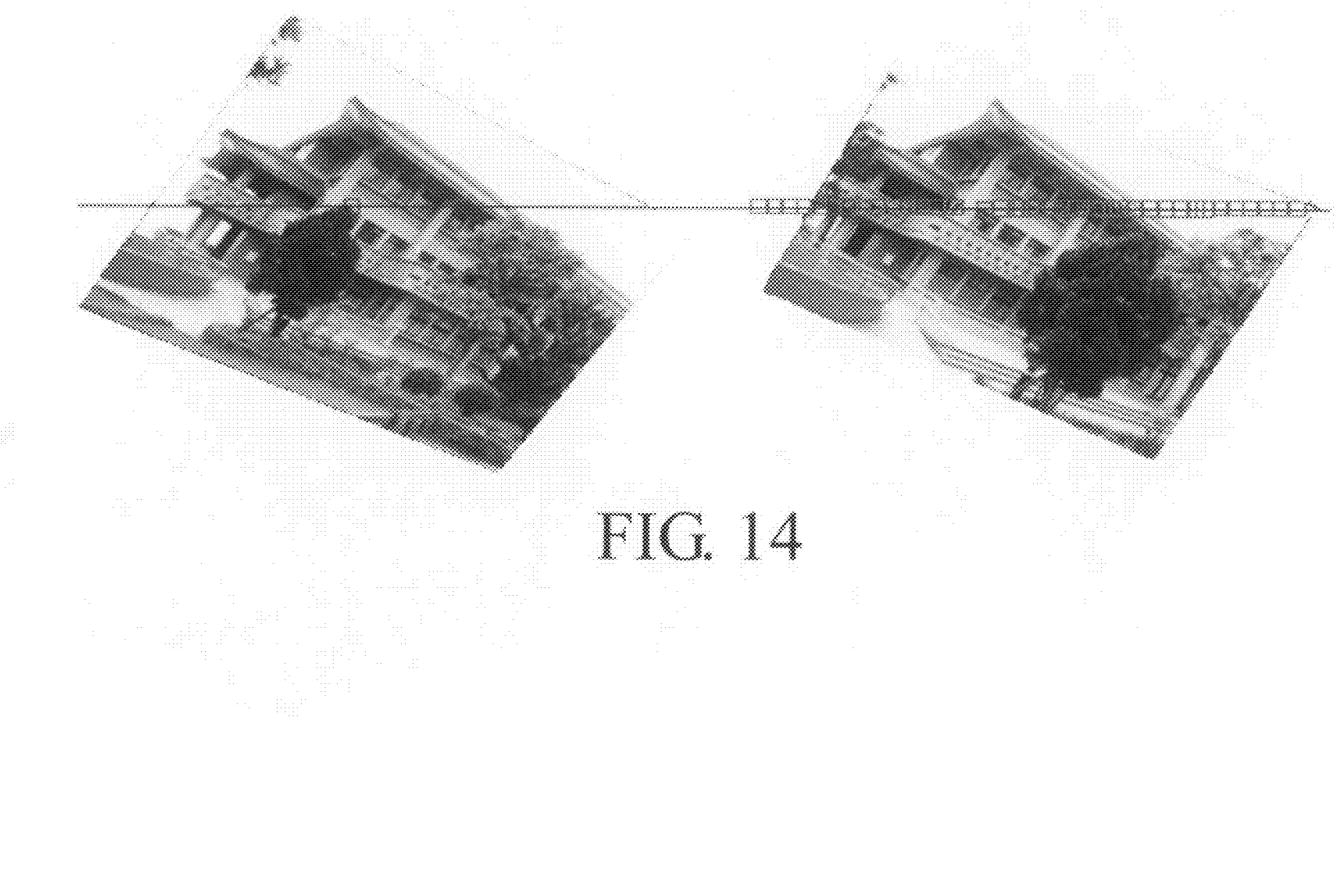
FIG. 14 is a schematic diagram illustrating image filling for a filling target area by seeking candidate patch blocks in the filling source image.

During image filling, obstructions such as trees in FIG. 9A can be removed from the specific image using image edition applications. After obstructions are removed, the areas corresponding to the original obstructions in the specific image become the areas to be patched, as shown in FIG. 9C. It is understood that the areas to be patched in the specific image can be divided into several filling target areas with a specific size such as 13×13 pixels. FIG. 10 is a flowchart of an embodiment of a method for determining the priority of filling target areas. In step S1010, a contour determination method, such as Laplacian Masks is used to obtain the contour of an area to be patched, as shown in FIG. 11. In step S1020, the edge intensity of respective filling target areas on the contour is calculated, as shown in FIG. 12, and in step S1030, the priority of the filling target areas is determined according to the edge intensity of respective filling target areas, where the filling target area with highest edge intensity is selected to patch first. FIG. 13 is a flowchart of an embodiment of a method for patching filling target areas. In step S1110, the similarities of a filling target area in the specific image and a plurality of candidate patch blocks on the epipolar line of the filling target area in the filling source image are respectively calculated, as shown in FIG. 14, where each block represents a candidate patch block. It is understood that the similarity of the filling target area and the candidate patch block can be calculated using a block-matching method, such as SSD (Sum of Squared Difference), NCC (Normalized Cross-Correlation), NSSD (Normalized Sum of Squared Difference), SAD (Sum of Absolute Difference), Rank and Census. In step S1120, the candidate patch block with highest similarity is selected as a patch block, and in step S1130, the selected patch block is obtained and used to patch the filling target area. It is understood that the differences of surrounding information of the filling target area and the candidate patch blocks are calculated in this embodiment, and the candidate patch block with least difference is considered to be similar to the filling target area, and is used to patch the filling target area. After the filling target area is patched, another filling target area having next high intensity is selected for patch until all filling target areas are patched.

After all filling target areas are patched, in step S170, the colors of the filling target areas are adjusted. Since the images captured at different angles may have differences in colors and brightness, marks may be left in the patched image if the image is directly patched using the patch block. Therefore, the color difference of the filling areas and the surroundings areas is calculated for compensation, or the filling areas and the surroundings areas can be embellished using image editing applications, smoothing the patch edges in the patched image. Additionally, the rectified image is returned according to the epipolar geometry relationship. That is the rectified specific image with image patched is transferred according to an inverse matrix of the fundamental matrix. In step S180, it is determined whether the image filling is complete. If so, the procedure is complete. If not, the procedure returns to step S130, another filling source image is selected from the captured images, and steps S140 to S170 are performed until the image filling for the specific image is complete.

The invention provides image filling methods that use images captured in different angles and epipolar geometry relationships therebetween to patch filling target areas.

Image filling methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A computer-implemented image filling method for use in a computer, wherein the computer is programmed to perform the steps of:

capturing a plurality of images corresponding to a target object or a scene at various angles;
calculating an epipolar geometry relationship between a filling source image and a specific image within the images;
rectifying the filling source image and the specific image according to the epipolar geometry relationship; and
patching at least one filling target area in the rectified specific image according to the rectified filling source image,
wherein the method of calculating the epipolar geometry relationship comprises the steps of:
determining a plurality of first characteristic points in the specific image;
determining a plurality of second characteristic points in the filling source image;
determining a plurality of corresponding points within the first characteristic points and the second characteristic points;
determining an optimum group of the corresponding points for the specific image and the filling source image; and
calculating a fundamental matrix for the epipolar geometry relationship according to the optimum group of the corresponding points.

2. The method of claim 1 further comprising:
determining a specific region in the specific image and the filling source image; and
determining the corresponding points fall in the specific region within the first characteristic points and the second characteristic points.

3. The method of claim 1 further comprising determining an optimum group of the corresponding points for the specific image and the filling source image according to LMedS (Least Median of Squares) or RANSAC (Random Sample Consensus).

4. The method of claim 1 wherein the method of patching at least one filling target area in the rectified specific image according to the rectified filling source image comprises:
obtaining a patch block from the filling source image; and
patching the filling target area in the specific image using the patch block.

5. The method of claim 4 further comprising obtaining a patch block from the filling source image according to an epipolar line corresponding to the filling target area in the specific image.

6. The method of claim 5 further comprising:
respectively calculating similarities of a plurality of candidate patch blocks on the epipolar line in the filling source image and the filling target area; and
selecting the candidate patch block with highest similarity to the patch block.

7. The method of claim 6 further comprising calculating the similarity of respective candidate patch blocks according to a block-matching method.

8. The method of claim 1 further comprising calculating a priority of the at least one filling target area to be patched, wherein the method of calculating the priority of the at least one filling target area to be patched comprises:
calculating an edge intensity of the at least one filling target area; and
determining the priority of the at least one filling target area according to the edge intensity.

9. The method of claim 8 further comprising:
obtaining a contour of the at least one filling target area; and
calculating the edge intensity of the at least one filling target area at the contour.

10. The method of claim 1 further comprising adjusting the colors of the at least one filling target area.

11. The method of claim 1 further comprising returning the rectified specific image with image patched according to the epipolar geometry relationship.

12. The method of claim 1 further comprising:
determining whether the image filling for the specific image is complete; and
if not, selecting a new filling source image within the images, calculating an epipolar geometry relationship between the new filling source image and the specific image, rectifying the new filling source image and the specific image according to the epipolar geometry relationship, and patching at least one filling target area in the rectified specific image according to the rectified new filling source image.

13. A machine-readable storage medium comprising a program, which, when executed, causes a device to perform an image filling method, the method comprising:
capturing a plurality of images corresponding to a target object or a scene at various angles;
calculating an epipolar geometry relationship between a filling source image and a specific image within the images;
rectifying the filling source image and the specific image according to the epipolar geometry relationship; and
patching at least one filling target area in the rectified specific image according to the rectified filling source image,
wherein the method of calculating the epipolar geometry relationship comprises:
determining a plurality of first characteristic points in the specific image;
determining a plurality of second characteristic points in the filling source image;
determining a plurality of corresponding points within the first characteristic points and the second characteristic points.
determining an optimum group of the corresponding points for the specific image and the filling source image; and
calculating a fundamental matrix for the epipolar geometry relationship according to the optimum group of the corresponding points.

14. The storage medium of claim 13 wherein the method further comprises:
determining a specific region in the specific image and the filling source image; and
determining the corresponding points in the specific region within the first characteristic points and the second characteristic points.

15. The storage medium of claim 13 wherein the method further comprises determining an optimum group of the corresponding points for the specific image and the filling source image according to LMedS (Least Median of Squares) or RANSAC (Random Sample Consensus).

16. The storage medium of claim 13 wherein the method of patching at least one filling target area in the rectified specific image according to the rectified filling source image comprises:
obtaining a patch block from the filling source image; and
patching the filling target area in the specific image using the patch block.

17. The storage medium of claim 16 wherein the method further comprises obtaining a patch block from the filling source image according to an epipolar line corresponding to the filling target area in the specific image.

18. The storage medium of claim 17 wherein the method further comprises:
respectively calculating similarities of a plurality of candidate patch blocks on the epipolar line in the filling source image and the filling target area; and
selecting the candidate patch block with highest similarity to the patch block.

19. The storage medium of claim 18 wherein the method further comprises calculating the similarity of respective candidate patch blocks according to a block-matching method.

20. The storage medium of claim 13 wherein the method further comprises calculating a priority of the at least one filling target area to be patched, wherein the method of calculating the priority of the at least one filling target area to be patched comprises:
calculating an edge intensity of the at least one filling target area; and
determining the priority of the at least one filling target area according to the edge intensity.

21. The storage medium of claim 20 wherein the method further comprises:
obtaining a contour of the at least one filling target area; and
calculating the edge intensity of the at least one filling target area at the contour.

22. The storage medium of claim 13 wherein the method further comprises adjusting the colors of the at least one filling target area.

23. The storage medium of claim 13 wherein the method further comprises returning the rectified specific image with image patched according to the epipolar geometry relationship.

24. The storage medium of claim 13 wherein the method further comprises:
determining whether the image filling for the specific image is complete; and
if not, selecting a new filling source image within the images, calculating an epipolar geometry relationship between the new filling source image and the specific image, rectifying the new filling source image and the specific image according to the epipolar geometry relationship, and patching at least one filling target area in the rectified specific image according to the rectified new filling source image.

* * * * *